Patented Nov. 30, 1948

2,454,950

UNITED STATES PATENT OFFICE 2,454,950

STABILIZED CELLULOSE ACETATE

William John Simpson and Donald Finlayson, Spondon, near Derby, England, assignors to Celanese Corporation of America, a corporation of Delaware No Drawing. Application August 6, 1946, Serial No. 688,706. In Great Britain August 21, 1945

4 Claims. (Cl. 106—182)

This invention is concerned with new compositions of matter having a basis of cellulose acetate or other cellulose esters or ethers and with articles formed of such compositions, for example fibres, foils and films, and is an improvement in or modification of the invention of U. S. application S. No. 510,787, filed November 18, 1943 (Patent No. 2,432,517).

As is stated in the parent specification, when fibres, foils and similar products having a basis of cellulose acetate or other cellulose ester or ether are exposed for a substantial period to the action of ultra-violet light, they undergo, in general and in company with fibres, foils and the like of other materials (e. g. fibres of cotton or regenerated cellulose) a marked loss of tensile strength. This latter is usually accompanied by a reduction in the intrinsic viscosity of the material of the fibres, foils and the like.

According to the parent specification, this undesirable action of ultra-violet light on cellulose acetate or other cellulose ester or ether, or compositions having a basis of such esters or ethers, (including articles formed of such esters or ethers or compositions), is very greatly reduced by including in the cellulose ester or ether or compositions a proportion, not exceeding 15% based on the weight of the cellulose ester or ether, of an ester of low volatility of an aromatic hydroxy carboxylic acid with a phenol, an alcohol containing an aromatic nucleus, or a cycloaliphatic alcohol. Good results are obtained with from 1% to 10%, e. g. 5%. By the term "low volatility" is meant that the ester does not lose more than 5% by weight when one gram thereof is heated in a dish in air at 60–70° for 20 hours.

According to the present invention, the esters used to reduce the destructive action of ultraviolet light contain in their molecules the residues of two or more molecules of aromatic hydroxy carboxylic acid. An especially important series of compounds are the esters of di- or poly-phenols with aromatic hydroxy carboxylic acids.

The residue of the aromatic hydroxy carboxylic acids employed in the esters of the present invention are preferably those of hydroxy benzene or hydroxy naphthalene monocarboxylic acids, for example salicylic acid, para-hydroxy-benzoic acid, para-cresotinic acid, 2-hydroxy-naphthalene-3-carboxylic acid and 1-hydroxy-naphthalene-2-carboxylic acid. Specific compounds for use according to the present invention include salicoyl-salicylic acid phenyl ester, tetra-salicylic acid methyl ester, (in which compounds the hydroxy group of one molecule of an aromatic hydroxy-carboxylic acid is esterified with another molecule of an aromatic hydroxy-carboxylic acid) and, among the preferred bodies, resorcinol disalicylate, hydroquinone disalicylate, β-naphthohydroquinone disalicylate, resorcinol di-para-cresotinate, hydroquinone di-para-cresotinate, and the di(2:3-oxynaphthoic)-ester of resorcinol.

As in the parent specification, good results are obtained using from 1 to 10%, e. g. 5% of the substance based on the cellulose acetate or other cellulose derivative. For example, a film (0.003 inch thick) of cellulose acetate containing about 5% of resorcinol disalicylate on the weight of the cellulose acetate suffers, on exposure to light from a mercury lamp, a percentage loss in strength only about one-eighth of that of a similar film free from the salicylate. The other bodies included within the present invention have a similar effectiveness as regards maintenance of strength. Moreover, the bodies are of low volatility and are substantially retained in the material and remain effective during normal storage and use of the cellulose ester or ether products. Under the action of ultra-violet light, the materials remain substantially colourless, and further, when subjected to bending tests, they do not exhibit brittleness.

The new compositions can, as indicated above, be in the form of fibres, foils, films or other shaped articles.

The incorporation of the ester of the aromatic carboxylic acid with the cellulose ester or ether can be effected in various ways, for example in any of the ways used for incorporating plasticisers with cellulose esters or ethers. Thus the cellulose ester or ether and the ester of an aromatic carboxylic acid can be dissolved in a common volatile solvent. For instance, in the case of cellulose acetate, acetone may be used or a mixture of acetone with diacetone alcohol. The solutions so obtained can then be spun into fibres, e. g. by dry spinning methods, or cast into foils or films and the solvent evaporated, or used as a lacquer for the production of coatings on textiles, wood, metal, or other materials. Again the cellulose ester or ether, for example as textile fibres, whether loose fibres or in the form of yarns or fabrics, may be allowed to absorb the ester of the aromatic carboxylic acid from an aqueous dispersion of the latter or may be impregnated with a solution of the ester of the aromatic carboxylic acid in a liquid which is not a solvent for the cellulose ester or ether, but advantageously is a swelling agent therefor, and the liquid then evaporated. For instance the ester can be incorporated in cellulose acetate textile material by impregnating the latter with a solution of the ester in aqueous ethyl alcohol, for instance aqueous ethyl alcohol of 70 to 90% strength by weight, e. g. ethyl alcohol in the form of methylated spirit. Solutions in aqueous propyl or isopropyl alcohol can likewise be employed.

Plasticizers may be incorporated in the compositions according to the precise properties it is desired to impart thereto. Again still other materials may be included therein, for example filling materials or colouring matters.

The cellulose derivative of the compositions can be cellulose acetate as mentioned above. Again it can be cellulose propionate, butyrate, or acetate-butyrate, or a cellulose ether, for instance ethyl or benzyl cellulose.

The invention is illustrated by the following example.

Example

A cellulose acetate dope of the following composition is prepared:

| | | |
|---|---|---|
| Resorcinol disalicylate | gms | 0.75 |
| Cellulose acetate | gms | 15.0 |
| Diacetone alcohol | ccs | 10.0 |
| Acetone | ccs | 90.0 |

This dope is then cast on a film casting surface of metal or glass and the volatile solvent evaporated so that a film of from 0.001 to 0.003 inch in thickness is obtained. The films so produced lose very little tensile strength when exposed to ultraviolet light from a quartz mercury vapour lamp under conditions which reduce by 90% the tensile strength of a film prepared in a similar manner but without the resorcinol disalicylate. The films do not become discoloured by the exposure to the ultra-violet light, and moreover they are not brittle when subjected to a bending test.

Having described our invention, what we desire to secure by Letters Patent is:

1. A composition of matter consisting essentially of cellulose acetate and, to reduce the destructive action of ultra violet light on the cellulose acetate, from 1–10% of the di-ester, of resorcinol, with a monohydroxy-monocarboxylic acid in which the hydroxyl group and the carboxyl group are directly attached to a nucleus selected from the group consisting of benzene nuclei and naphthalene nuclei.

2. A composition of matter consisting essentially of cellulose acetate and, to reduce the destructive action of ultra violet light on the cellulose acetate, from 1–10% of resorcinol disalicylate.

3. Cellulose acetate fibers containing from 1–10% of resorcinol disalicylate based on the weight of the cellulose acetate.

4. Cellulose acetate films containing from 1–10% of resorcinol disalicylate based on the weight of the cellulose acetate.

WILLIAM JOHN SIMPSON.
DONALD FINLAYSON.

REFERENCES CITED

The following references are of record in the file of this patent:

UNITED STATES PATENTS

| Number | Name | Date |
|---|---|---|
| 1,193,178 | Mork | Aug. 1, 1916 |
| 1,319,229 | Lindsay | Oct. 21, 1919 |
| 2,086,418 | Hunt | July 6, 1937 |
| 2,392,361 | Britton | Jan. 8, 1946 |